United States Patent [19]
Pannell et al.

[11] Patent Number: 6,076,313
[45] Date of Patent: Jun. 20, 2000

[54] FACILITY FOR MAINTAINING AN ITEM IN A CONTROLLED ENVIRONMENT

[75] Inventors: John Pannell, Midwest City; Rupert R. Thomas, Sr., Edmond, both of Okla.

[73] Assignee: Earthsource Technologies, Inc., Midwest City, Okla.

[21] Appl. No.: 09/110,625

[22] Filed: Jul. 6, 1998

[51] Int. Cl.[7] .................................................. E02D 27/00
[52] U.S. Cl. .................... 52/169.6; 52/169.1; 52/169.11; 52/302.3
[58] Field of Search ............................... 52/169.6, 302.3, 52/80, 82, 169.1, 169.7, 169.11

[56] References Cited

U.S. PATENT DOCUMENTS

| | | |
|---|---|---|
| 625,258 | 5/1899 | Grow . |
| 2,822,765 | 2/1958 | Rudinger . |
| 3,092,933 | 6/1963 | Closner et al. . |
| 3,227,061 | 1/1966 | Swayze . |
| 3,701,262 | 10/1972 | Connell et al. . |
| 3,707,850 | 1/1973 | Connell et al. . |
| 4,321,775 | 3/1982 | Emerson ............................. 52/169.6 X |
| 4,359,845 | 11/1982 | Harrison . |
| 4,488,392 | 12/1984 | Pearcey et al. . |
| 4,534,144 | 8/1985 | Gustafsson et al. .................... 52/169.6 |
| 4,631,872 | 12/1986 | Daroga ............................... 52/169.6 X |
| 4,642,952 | 2/1987 | Prandin .................................. 52/169.6 |
| 5,344,362 | 9/1994 | Bagley . |

OTHER PUBLICATIONS

Tree Fruit Postharvest Journal, Oct. 1997, vol. 8, No. 3, Cooperative Extension Washington State University.

Hait and the Rocky Mountain Research Center, Passive Annual Heat Storage Improving the Design of Earth Shelters, 1993, Rocky Mountain Research Center.

Kaeser Compressors Brochure, "Screw Compressors M12 Portable Compressor", 1996.

Kaeser Compressors, Inc. Brochure, "Air Compressor Guide Getting the Most for Your Money", 1992.

Formworks Building, Inc., Durango, CO brochure.

Seal Master brochure, "Custom–built Inflatable Seals" and specifications.

Advertisement, Teton West, Idaho, Patent No. 5,344,362 Potato patent: Mother Nature. Storage patent: Teton West.

Potato Grower, Dec. 1994, pp. 14–15, 25.

Potato Grower, Dec. 1997, pp. 8–9.

Machine Design, Sep. 11, 1997, "More practical wind power", p. 35.

Wallguard Corporation product description, 1997.

*Primary Examiner*—Carl D. Friedman
*Assistant Examiner*—Yvonne M. Horton
*Attorney, Agent, or Firm*—Dunlap, Codding & Rogers, P.C.

[57] ABSTRACT

A method and apparatus for providing a controlled environment for storing, producing, growing and/or processing at least one item. The method includes the steps of introducing an item into an enclosed storage space separated from an interior of a first thermal mass layer by a vessel formed of a heat conductive material. The exterior of the first thermal mass layer is then thermally isolated and the temperature of the first thermal mass is regulated to control the temperature in the enclosed storage space.

13 Claims, 3 Drawing Sheets

FACILITY FOR MAINTAINING AN ITEM IN A CONTROLLED ENVIRONMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The storage, producing, growing and processing of delicate items such as fruits, vegetables, grains, meats, film, and cut flowers, for example, is an important function provided in society. For example, many types of delicate items such as fruits, vegetables and grains are harvested only one time annually. However, the demand for such delicate items is substantially constant throughout the year. Thus, once the delicate items have been harvested, the delicate items must be placed in storage or processed to prevent the delicate items from spoiling before the delicate items are selectively dispersed based on demand.

The cost associated with such storage is factored into the cost which the grocery stores and consumers ultimately pay. The amount of the cost associated with such storage typically depends on the type of controlled atmosphere necessary for the storage of each type of delicate item. In general, the costs associated with such storage increase as the stored temperature of the delicate items decreases.

To store these delicate items more effectively, attempts have been made to control the temperature, the humidity and other factors associated with the environment in which the delicate items are to be stored.

However, there have been problems associated with the prior art storage of delicate items. For example, prior art storage systems for storing delicate items, such as fruits, vegetables and grains have utilized fans to move cooled air across the delicate items to maintain same at a predetermined cool temperature. The movement of air across the delicate items reduces the moisture content of the delicate items, thereby reducing the weight and quality of the delicate items. In addition, the motors utilized in the fans generate heat thereby increasing the cost of maintaining the delicate items in a cool environment.

To aid the prior art storage systems in the control of the environment in which the delicate items are to be stored, plastics or other gas impermeable substances have been disposed on the interior of the storage building. However, the plastics or other gas impermeable substances transfer chemicals to the delicate items, which alters the taste and/or the quality of the delicate items.

The prior art storage buildings were provided with at least one layer of insulation disposed on the walls, and ceiling thereof to thermally insulate the stored delicate items from the atmosphere exterior to the storage building so that the temperature in the enclosed storage space could be controlled. However, the insulation was not disposed on the walls and ceiling in a uniform manner. This led to the formation of random hot and cold areas on the walls and ceiling of the prior art storage buildings. These random hot and cold areas caused condensation to form on the walls and ceilings of the storage buildings, which then harmed the delicate items which were being stored in the prior art storage building.

Finally, prior art storage buildings are typically disposed above ground and inherently unsightly.

If one could reliably and cost effectively store delicate items in a controlled environment while eliminating the problems associated with the reduction of moisture content, chemical transfer, hot and cold areas, condensation and unsightly buildings, the quality of the stored delicate items and the aesthetics of the communities in which such storage buildings were located would be enhanced. It is to such an improved facility that the present invention is directed.

BRIEF SUMMARY OF THE INVENTION

Broadly, the present invention is a facility for the storage, production, growing or processing of an item wherein the item is maintained in a controlled environment for extended periods of time. The facility includes a vessel formed of a heat conductive material. The vessel includes a foundation, a top wall and at least one sidewall extending between the foundation and the top wall. The foundation, sidewall and top wall cooperate to define an enclosed storage space adapted to receive items to be stored.

The facility also includes a first thermal mass layer substantially surrounding the foundation, sidewall and top wall of the vessel such that the vessel separates the first thermal mass layer from the enclosed storage space. The thermal mass layer stores a sufficient amount of energy to equalize the temperature of the first thermal mass layer and the vessel and to act as a thermal barrier and thereby retard the flow of thermal energy from the vessel when energy is being added to the first thermal mass layer.

An insulating layer substantially surrounds the first thermal mass layer for thermally isolating the first thermal mass layer and the vessel from the environment external to the first thermal mass layer.

A heating/cooling unit is provided for inputting energy directly into the first thermal mass layer and for thereby controlling the temperature of the first thermal mass layer. The temperature of the vessel is also thereby controlled as the vessel will be inherently maintained at the same temperature as the first thermal mass layer.

At least one sensor is also provided for sensing the temperature of at least one of the first thermal mass layer, vessel, enclosed storage space, and items to be stored. The sensor outputs a data signal indicative of the sensed temperature.

Lastly, an environmental control computer is provided. The environmental control computer is operably connected to at least one heating/cooling unit for receiving the data signal output by the sensor and for selectively actuating the heating/cooling unit and deactivating the heating/cooling unit to maintain the sensed temperature at a substantially constant predetermined level.

As will be apparent to those skilled in the art upon a reading of the present specification in view of the attached drawings and appended claims, the facility of the present invention provides a cost-effective, and reliable structure for storing, producing, growing and/or processing delicate items for extended periods of time. That is, the temperature of the thermal mass layer is moderated by the insulating layer enclosing the thermal mass layer. The temperature of the thermal mass layer can be controlled by the heating/cooling unit. The controlling of the temperature of the first thermal mass layer inherently controls the temperature of the vessel and thereby the items stored within the vessel. This reduces the amount of air flow over the stored items within the vessel and also substantially eliminates hot and cold areas on the vessel and the stored items thereby substantially eliminating the problems associated with moisture reduction and condensation.

To further moderate the temperature within the vessel, a second thermal mass layer can be disposed about the insulating layer. For example, the facility can be disposed underneath the surface of the earth whereby the earth will form the second thermal mass layer. By disposing the facility underneath the surface of the earth, the temperature within the first thermal mass layer and the vessel is moderated. The surface of the earth overlying the facility can then be landscaped thereby making the facility more aesthetically pleasing.

DETAILED DESCRIPTION OF THE SEVERAL VIEWS OF THE DRAWING

Figure 1:
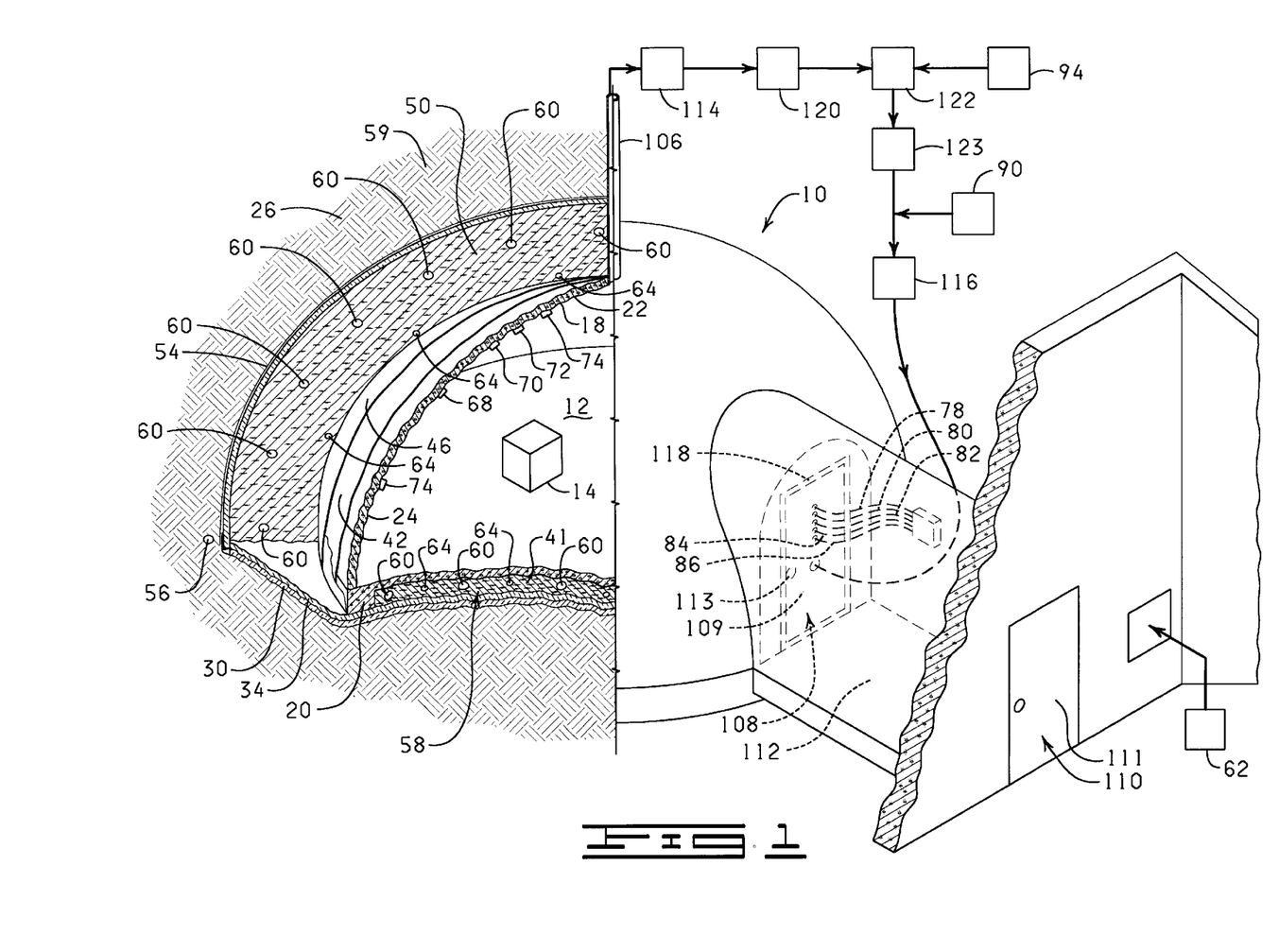
FIG. 1 is a partial cross-sectional, fragmental, perspective view of a facility constructed in accordance with the present invention.
Figure 2:
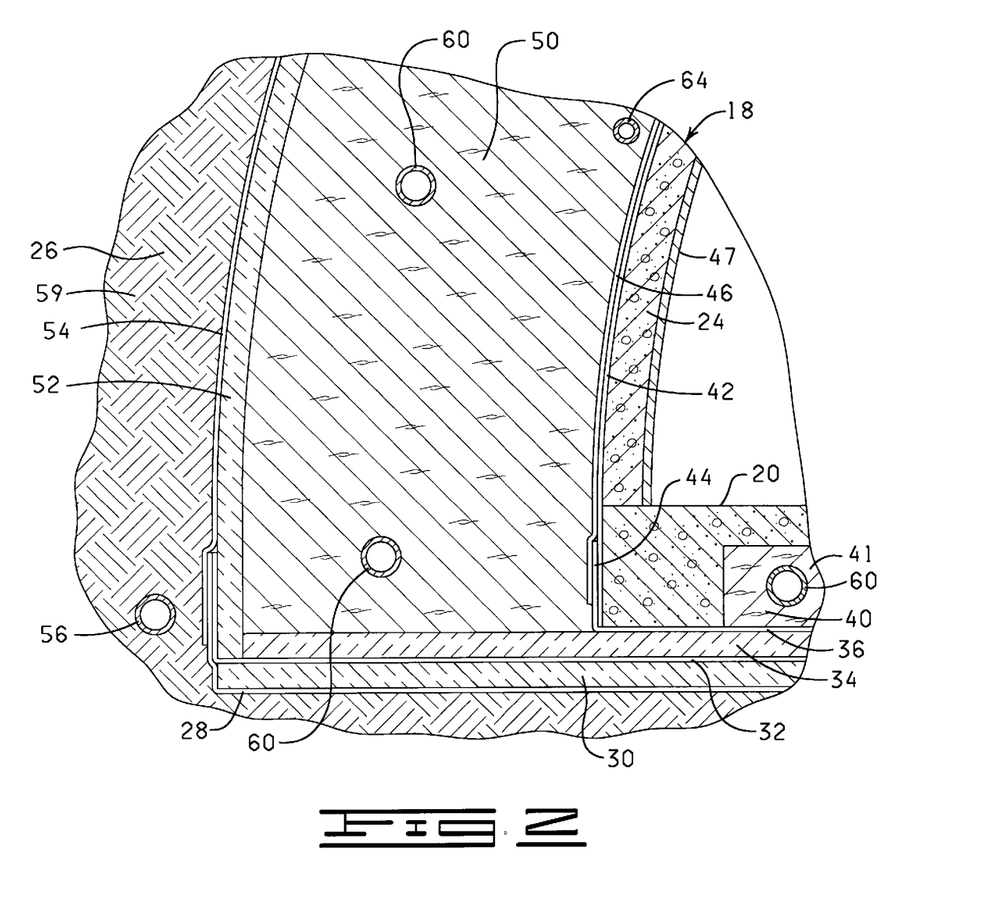
FIG. 2 is an enlarged, partial cross-sectional view of a portion of the facility depicted in FIG. 1.

Referring now to the drawings and more particularly to FIGS. 1 and 2, shown therein and designated by the general reference numeral 10 is a facility defining an enclosed storage space 12 adapted to receive items 14 for maintaining the items 14 in a controlled environment for extended periods of time. The facility 10 can be a building adapted to store, produce, grow and/or process the items 14. The items 14 can be delicate items such as fruits, vegetables, grains, meats, film, cut flowers, animal waste, chemicals, fungus, dairy products and combinations thereof, for example.

The facility 10 includes a vessel 18 which is formed of a heat conductive material, such as plasticized concrete, or any other suitable blend of concrete. The vessel 18 includes a foundation 20, a top wall 22, and at least one sidewall 24 extending between the foundation 20 and the top wall 22. The foundation 20, the sidewall 24 and the top wall 22 cooperate to define the enclosed storage space 12 which is adapted to receive the items 14 to be stored as previously discussed. In the embodiment of the vessel 18 which is shown in FIG. 1, the vessel 18 is shaped in the form of a dome, and the top wall 22 and the sidewall 24 are integrally formed to form a unitary structure. The vessel 18 can be constructed in a manner disclosed in U.S. Pat. No. 4,488,392, titled "UNDERGROUND HOUSE AND CONSTRUCTION METHOD", issued on Dec. 18, 1984, which disclosure is hereby expressly incorporated herein by reference.

Before the vessel 18 is constructed, an opening is excavated in the earth 26. The earth 26 and the material removed during excavation of the opening in the earth 26 can be pushed aside so that it later can be utilized in the construction of the facility 10 as will be described in detail hereinafter.

As shown in detail in FIG. 2, a first plastic sheet 28 is disposed on the earth 26 in the excavated opening. A first layer of insulation 30 is disposed on top of the first plastic sheet 28. A second plastic sheet 32 is disposed on the first layer of insulation 30 and substantially covers the first layer of insulation 30. A second layer of insulation 34 is disposed on top of the second plastic sheet 32 and substantially covers the second plastic sheet 32 thereof. A third plastic sheet 36 is disposed on the second layer of insulation 34. The first, second and third plastic sheets 28, 32 and 36 can be an industrial grade of plastic sheeting. The first and second layers of insulation 30 and 34 can be constructed of dow board insulation.

The foundation 20 of the vessel 18 is disposed on the third plastic sheet 36. The foundation 20 of the vessel 18 can be a poured concrete floor slab adapted to support the top wall 22 and the sidewall 24.

The foundation 20 is provided with an inverted u-shaped cross section so as to form a cavity 40. The cavity 40 is enclosed by the foundation 20 and the third plastic sheet 36. The cavity 40 is filled with a thermal mass layer 41. In one embodiment, the thermal mass layer 41 can be soil or sand, which has had substantially all of the moisture removed therefrom to decrease the coefficient of thermal transfer. The thermal mass layer 41 can have a thickness of at least about eight inches.

Once the vessel 18 is positioned on the third plastic sheet 36, a first substance 42 is applied to an exterior surface of the vessel 18 to seal the pores of the vessel 18 and to thereby form the vessel 18 into a gas impermeable barrier.

As shown in FIGS. 1 and 2, a portion 44 of the third plastic sheet 36 extends outwardly from the foundation 20 of the vessel 18. The portion 44 of the third plastic sheet 36 is moved upwardly against the first substance 42 which was applied to the vessel 18. During construction of the facility 10, the portion 44 of the third plastic sheet 36 is maintained in this position by bonding the portion 44 to the first substance 42 on the vessel 18 via a suitable adhesive or cohesive, for example. A second substance 46 is applied over the first substance 42, and the portion 44, substantially as shown in FIG. 2. The second substance 46 serves to waterproof the exterior of the vessel 18 and to form a gas impermeable barrier to permit a partial vacuum to be drawn in the enclosed storage space 12.

A third substance 47 (FIG. 2) can be applied to the interior of the vessel 18, if desired. The third substance 47 can be a material adapted to provide a liquid and/or gas impermeable barrier to permit the enclosed storage space 12 to be pressurized. For example, when the vessel 18 is formed of a concrete material, the third substance 47 can be a rubber polymer waterproofing membrane, such as Wall Guard brand rubber polymer obtainable from Low Guard Corporation located in Oak Creek, Wis., which permits the enclosed storage space 12 to be pressurized from about 120 to about 150 psi. It should be noted that the third substance 47 can be any material capable of lining the interior of the vessel 18 and that the particular material which is chosen as the third substance 47 typically depends on the type of item 14 to be stored, produced, grown and/or processed within the vessel 18. For example, the third substance 47 can be stainless steel, glass or ceramics when the items 14 to be stored are dairy products, chemicals or petroleum products.

In general, the type of material utilized to form the vessel 18 will depend on the type of item 14 intended to be stored within the facility 10. In one embodiment, the stored items 14 can be delicate items (as defined above) and the vessel 18 can be formed of a plasticized concrete, such as gunite or shot-crete, and/or any other suitable concrete blend. In this embodiment, the first substance 42 can be a substance capable of sealing the pores of the concrete, such as XYPEX brand concentrate obtainable from CCL, Incorporated located in Dallas, Tex. When the vessel 18 is formed of concrete as discussed, the second substance 46 can be a rubber polymer waterproofing membrane, such as Wall Guard brand rubber polymer obtainable from Low Guard Corporation located in Oak Creek, Wis. It should be noted that the vessel 18 serves to isolate the stored items 14 from the first and second substances 42 and 46 so that the chemicals in the first and second substances 42 and 46 are not transmitted to the stored items 14.

A thermal mass layer 50 substantially surrounds the sidewall 24 and the top wall 22 of the vessel 18 such that the vessel 18 separates the thermal mass layer 50 from the enclosed storage space 12. The thermal mass layer 50 serves to store a sufficient amount of energy to equalize the temperature of the thermal mass layer 50 and the vessel 18 and also acts as an energy barrier and thereby retards the flow of energy from the vessel 18 when energy is being added to the thermal mass layer 50 as will be discussed hereinafter. In one embodiment, the thermal mass layer 50 can be formed of a quantity of material capable of forming a thermal mass, such as dirt or sand, which has had substantially all of the moisture removed therefrom, if desired.

A third layer of insulation 52 is provided on the exterior of the thermal mass layer 50 to substantially encompass and enclose the thermal mass layer 50. The third layer of insulation 52 thermally isolates the first thermal mass layer 50 and the vessel 18 from the atmosphere external to the third layer of insulation 52 thereof. The third layer of insulation 52 can be formed of Dow board, for example.

The first, second and third layers of insulation 30, 34 and 52 are sized so as to retain the energy within the thermal mass layers 41 and 50 at the desired levels or to substantially stop the influence of outside temperature changes. In any event, the first, second and third layers of insulation 30, 34 and 52 are sized and constructed to have a much lower coefficient of energy transfer therethrough as compared to the coefficient of energy transfer through the vessel 18.

A waterproofing layer 54 is provided over the third layer of insulation 52 to provide a liquid impermeable barrier around the third layer of insulation 52. In one embodiment, the waterproofing layer 54 can be a Delta-Drain brand waterproofing layer obtainable from Cosella Dorken of Beamsville, Ontario Canada. As best shown in FIG. 2, the ends of the first plastic sheet 28 and the second plastic sheet 32 are tucked in between the third layer of insulation 52 and the waterproofing layer 54 so as to waterproof the underside of the facility 10 and to maintain the thermal mass layer 50 in its substantially dry state. To further aid in waterproofing the facility 10, a french drain 56 can be provided adjacent the waterproofing layer 54 to channel water or other fluids away from the facility 10, if desired. A pumping system (not shown) can also be connected to the french drain 56, if necessary.

It should be noted that the thermal mass layers 41 and 50 cooperate to provide a substantially unitary first thermal mass layer 58 surrounding the entire vessel 18. The thermal mass layers 41 and 50 can be sized to obtain a desired retention of energy to stop or substantially dampen the effects of outside climatic changes.

The earth 26 is then moved around the waterproofing layer 54 to substantially surround the facility 10. The earth 26 forms a second thermal mass layer 59 surrounding the facility 10.

One advantage of positioning the facility 10 below the surface of the earth 26 is that the earth 26 inherently serves to absorb and store large amounts of energy to dampen the effects of climatic changes in the atmosphere external to the earth 26. Also, the earth 26 serves to eliminate dynamic influences on the exterior of the facility 10 due to convection and sunshine thereby making the facility 10 more energy efficient.

Depending on the particular location on the earth 26 where the facility 10 is located, and the anticipated storage temperature within the facility 10, the facility 10 can be disposed between about three feet below the surface of the earth 26 to about 20 feet below the surface of the earth 26.

A plurality of energy transfer tubes 60 are spatially disposed about uniformly throughout the thermal mass layers 41 and 50. The thermal mass layers 41 and 50 engage and support the energy transfer tubes 60. An energy transfer medium (not shown), such as air, water or a refrigerant material, is selectively circulated through the energy transfer tubes 60 via a first heating/cooling unit 62 (FIGS. 1 and 3) to selectively draw energy out of the thermal mass layers 41 and 50, or to selectively add energy to the thermal mass layers 41 and 50.

Figure 3:
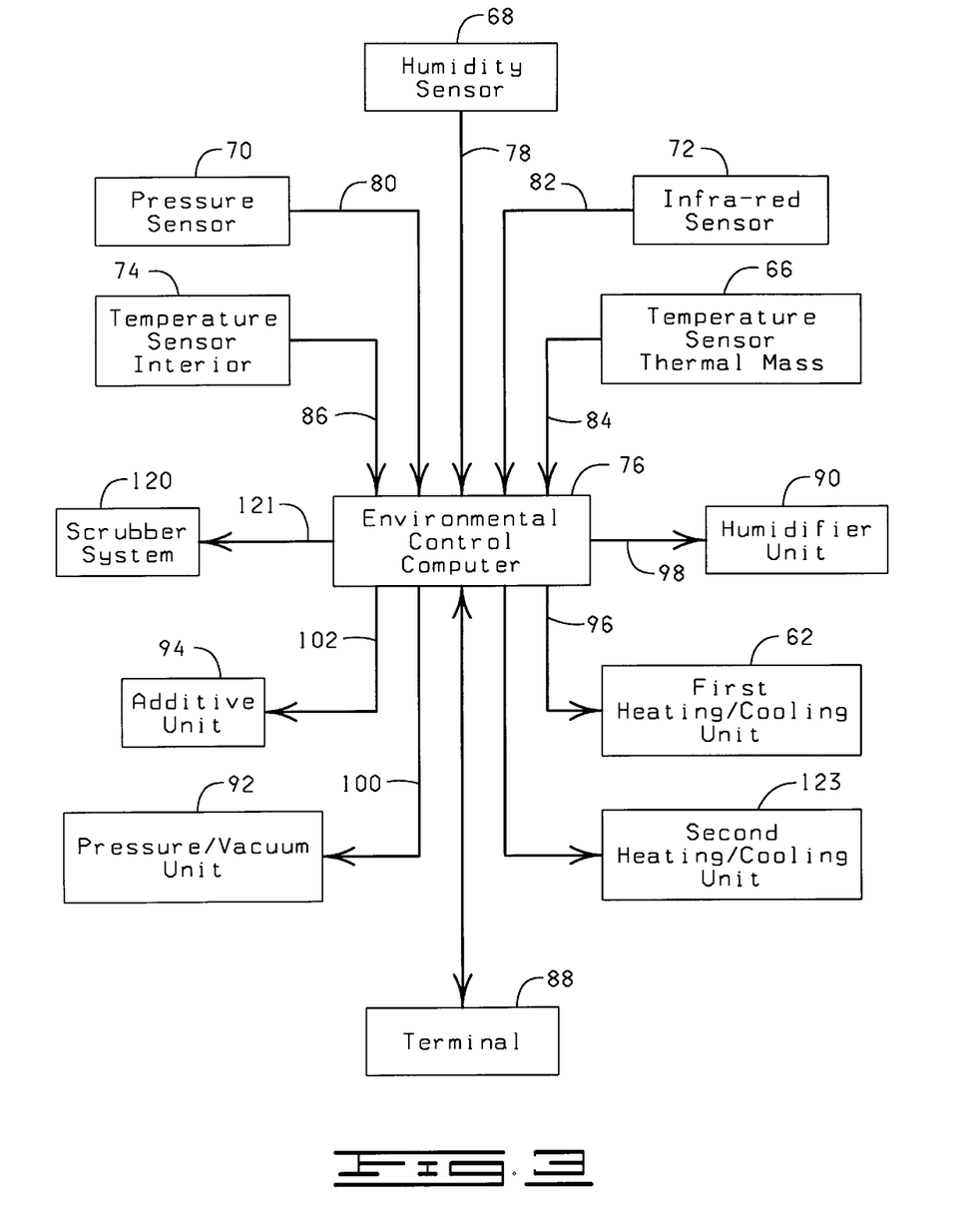
FIG. 3 is a schematic, diagrammatic view of a control system operating in accordance with the present invention.

The first heating/cooling unit 62 is shown diagrammatically in FIG. 3. The first heating/cooling unit 62 is desirably a vortec, water source heat pump or other suitable heating/cooling unit which is environmentally friendly, yet effective to slowly change and/or maintain the temperature of the thermal mass layers 41 and 50. The first heating/cooling unit 62 can be obtained from ITWVORTEC of Cincinnati, Ohio.

Ideally, the first heating/cooling unit 62 and the thermal mass layers 41 and 50 are sized such that the temperature of the thermal mass layers 41 and 50 can be so slowly adjusted that the temperature of the vessel 18 also closely follows the temperature of the thermal mass layers 41 and 50. For example, the inherent lag time for adjusting the temperature of the thermal mass layers 41 and 50 can be increased by increasing the size of the thermal mass layers 41 and 50 and/or decreasing the size of the first heating/cooling unit 62. Likewise, the inherent lag time for adjusting the temperature of the thermal mass layers 41 and 50 can be decreased by decreasing the size of the thermal mass layers 41 and 50 and/or increasing the size of the first heating/cooling unit 62. The thickness of the thermal mass layers 41 and 50 depends on the heat transfer coefficient of the particular material utilized in forming the thermal mass layers 41 and 50. In one embodiment when the thermal mass layers 41 and 50 are constructed of soil and/or sand, the thermal mass layer 41 can have a thickness of at least eight inches, and the thermal mass layer 50 can have a thickness of at least twelve inches.

A plurality of sensor tubes 64 are also spatially disposed about uniformly throughout the thermal mass layers 41 and 50. The sensor tubes 64 are sized and dimensioned to receive thermal mass temperature sensors 66 therein so that the temperature of the thermal mass layers 41 and 50 can be monitored. Only one thermal mass temperature sensor 66 is shown diagrammatically in FIG. 3 for purposes of clarity. A cable (not shown) can be connected to the thermal mass temperature sensors 66 to selectively move the thermal mass temperature sensors 66 through the sensor tubes 64 and thereby obtain temperature readings from various locations within the thermal mass layers 41 and 50. The thermal mass temperature sensors 66 can be thermocouples.

A humidity sensor 68 is disposed on the interior of the sidewall 24 of the vessel 18, to communicate with the storage space 12 enclosed within the vessel 18. A pressure sensor 70, infrared sensor 72 and a plurality of interior temperature sensors 74 are all disposed on the sidewall 24 and/or the top wall 22 of the vessel 18 to also communicate with the storage space 12 enclosed within the vessel 18. The interior temperature sensors 74 are spaced around the vessel 18 so that the temperature exchange between the storage space 12 and the vessel 18 can be monitored. The outputs of the humidity sensor 68, pressure sensor 70, infrared sensor 72, thermal mass temperature sensors 66 and the interior temperature sensors 74 are input into an environmental control computer 76 via respective signal paths 78, 80, 82, 84 and 86. Only one of the interior temperature sensors 74 is shown in FIG. 3 for purposes of clarity.

The infrared sensor 72 serves to detect and/or monitor hot and cold areas in the vessel 18. The environmental control computer 76 is programmed such that upon receipt of a signal indicative of a hot and/or cold area from the infrared sensor 72, the environmental control computer 76 outputs signals to suitable devices so as to cool the hot areas and/or warm the cold areas so as to maintain the entire enclosed storage space 12 at a constant predetermined temperature. For example, the environmental control computer 76 can selectively actuate a gas release valve (not shown) to permit warm gasses to escape from the enclosed storage space 12, and/or the environmental control computer 76 can actuate a director (not shown) to direct a cooled or warmed air stream at the hot and/or cold areas.

A terminal 88 is provided to permit an operator to input predetermined environmental conditions into the environmental control computer 76 and to monitor the actual environmental conditions within the facility 10. The environmental control computer 76 receives the signals transmitted on the signal paths 78, 80, 82, 84 and 86, and in response thereto, the environmental control computer 76 is programmed to selectively output signals to the first heating/cooling unit 62, a humidifier unit 90, a pressure/vacuum unit 92 and an additive unit 94 via respective signal paths 96, 98, 100 and 102.

For example, if the humidity within the storage space 12 enclosed within the vessel 18 (as indicated by the humidity sensor 68) falls below a predetermined limit stored in the environmental control computer 76, the environmental control computer 76 outputs a signal over the signal path 98 to the humidifier unit 90 to increase the humidity in the vessel 18. Likewise, if the pressure in the storage space 12 within the vessel 18 (as indicated by the pressure sensor 70) falls below a predetermined limit stored in the environmental control computer 76, the environmental control computer 76 is programmed to output a signal over the signal path 100 to the pressure/vacuum unit 92 to increase the pressure in the vessel 18.

The pressure/vacuum unit 92 is shown in more detail in FIG. 1. A first tube 106 is disposed through the waterproofing layer 54, the third layer of insulation 52, the thermal mass layer 50 and the top wall 22 of the vessel 18 such that the first tube 106 communicates with the storage space 12 enclosed within the vessel 18.

The vessel 18 forms a first door receiving opening 108 sized and adapted to matingly receive a first door 109 therein. The first door 109 can be supported by hinges and selectively moved into and out of the first door receiving opening 108 to provide access to the enclosed storage space 12. The first door 109 can be constructed of a rigid material, such as steel. The vessel 18 forms a second door receiving opening 110 sized and adapted to matingly receive a second door 111 therein. The second door receiving opening 110 is spaced a distance from the first door receiving opening 108 by an entranceway 112. The second door 111 can be supported by hinges and selectively moved into and out of the second door receiving opening 110 to provide access to the entranceway 112.

A second tube 113 is disposed through the first door 109 such that the second tube 113 communicates with the storage space 12 enclosed within the vessel 18.

The pressure/vacuum unit 92 is provided with a first pump 114 and a second pump 116. The first pump 114 communicates with the first tube 106 and functions to draw gases out of the storage space 12 enclosed within the vessel 18. The second pump 116 communicates with the second tube 113 and functions to move gases into the storage space 12 enclosed within the vessel 18. As shown in FIG. 1, the first and second pumps 114 and 116 are disposed outside of the vessel 18 so that heating of the items 14 in the storage space 12 by the heat produced by the motors within the first and second pumps 114 and 116 is kept to a minimum.

It should be noted that the first door 109 is sealed in the door receiving opening 108 of the vessel 18 via a seal 118 to provide a gas and fluid impermeable barrier therebetween. The seal 118 is shown in dashed lines in FIG. 1. The seal 118 can be an inflatable seal obtainable from Seal Master Corporation of Kent, Ohio.

The first pump 114 and the second pump 116 are controlled by the environmental control computer 76 via the signal path 100. By changing the pumping speed of the first pump 114 relative to the second pump 116, the pressure within the storage space 12 enclosed within the vessel 18 can be increased or decreased. That is, if the pumping speed of the first pump 114 is greater than the pumping speed of the second pump 116, the pressure within the vessel 18 is decreased, which is desirable in some applications. Likewise, if the pumping speed of the first pump 114 is less than the pumping speed of the second pump 116, the pressure in the vessel 18 is increased, which is also desirable in some applications.

It should be noted that the first substance 42, the second substance 46, and the third plastic sheet 36 cooperate to form a gas and fluid impermeable barrier to prevent the release and/or entrance of gases and/or fluids into the vessel 18.

The composition of the gas within the storage space 12 enclosed within the vessel 18 is constantly changing as the stored items 14 naturally respirate. The gas received by the first pump 114 is pumped into a scrubber system 120 to control the gas mixture. The scrubber system 120 receives predetermined gas mixture parameters from the environmental control computer 76 via a signal path 121. After the gas drawn from the storage space 12 passes through the scrubber system 120, the gas is stored in a gas storage system 122.

Various additives can be added to the gas stored in the gas storage system 122 via the additive unit 94. For example, additives which change or enhance the smell, taste or vitamin content of the stored items 14 can be injected into the gas storage system 122, or additives, such as fumigants can be injected into the gas storage system 122 to control any rodents or pests which are located within the vessel 18. These additives can be recovered and reused, if desired, by a suitable gas recovery system.

A second heating/cooling unit 123 selectively draws gas out of the gas storage system 122. The heated or cooled gas is passed through the humidifier unit 90 to add humidity to, or take humidity away from the heated or cooled gas. The second pump 116 then injects the gas through the second tube 113.

It should be noted that the signal paths 78, 80, 82, 84 and 86 pass through the first door 109 via gas and fluid-tight adapters (not shown). The first tube 106 and the second tube 113 also include seals (not shown) thereabout to assure a gas- and fluid-tight seal. Thus, the entire vessel 18 can be sealed to form a structure capable of storing large amounts of compressed gas and capable of retaining a partial vacuum pulled in the enclosed storage space 12.

The facility 10 is also provided with a second heating/cooling unit 123 for controlling the temperature of the gasses entering the enclosed storage space 12 through the second tube 113. The operation of the second heating/cooling unit 123 will be described hereinafter.

OPERATION

The operation of the facility 10 will now be discussed. Initially, the predetermined environmental condition parameters, such as humidity, temperature, pressure and gas content are entered into the environmental control computer 76 via the terminal 88. Upon receipt of the environmental condition parameters, the environmental control computer 76 outputs a signal to the first heating/cooling unit 62 to adjust the temperature of the thermal mass layers 41 and 50 to a predetermined amount above or below the desired storage temperature when the items 14 introduced into the enclosed storage space 12 are at a temperature greater than or less than, respectively, the desired temperature so that the thermal energy stored in the items 14 will be respectively drawn into or away from the thermal mass layers 41 and 50 to equalize the temperature of the items 14 and the thermal mass layers 41 and 50 at the desired temperature.

For example, if the items 14 to be stored are potatoes having a temperature of 80 degrees Fahrenheit, and the desired storage temperature is 50 degrees Fahrenheit, the temperature of the thermal mass layers 41 and 50 may be adjusted to 48 degrees Fahrenheit so that upon introducing the potatoes into the enclosed storage space 12, the stored energy within the potatoes will be drawn into the thermal mass layers 41 and 50 to equalize the temperatures of the potatoes and the thermal mass layers 41 and 50 at 50 degrees Fahrenheit.

Once the temperature of the thermal mass layers 41 and 50 reaches the desired predetermined temperature, the first and second doors 109 and 111 are opened and the items 14 are introduced into the enclosed storage space 12 through the entranceway 112. The first and second doors 109 and 111 are then closed, and the seal 118 surrounding the first door 109 is inflated, if necessary to seal the first door receiving opening 108.

The environmental control computer 76 then receives signals from the humidity sensor 68, interior temperature sensors 74 and the pressure sensor 70 to sense the initial environment of the enclosed storage space 12. The environmental control computer 76 then selectively sends signals to the pressure/vacuum unit 92 to actuate the first pump 114 and the second pump 116, to the scrubber system 120 to control the gas mixture, to the additive unit 94 to control the additives added to the gas mixture, to the humidifier unit 90 to control the humidity and the second heating/cooling unit 123 to control the temperature of the gas mixture.

Once it has been determined by the interior temperature sensors 74 and the thermal mass temperature sensors 66 that the temperatures of the stored items 14 and the thermal mass layers 41 and 50 have been equalized, the second heating/cooling unit 123 can be deactuated. Thereafter, the temperature of the thermal mass layers 41 and 50 is maintained at the predetermined temperature by the selective actuation and deactuation of the first heating/cooling unit 62. By maintaining the thermal mass layers 41 and 50 at the predetermined temperature, the temperatures of the vessel 18 and the stored items 14 are also maintained at the same predetermined temperature. Readings can be taken from the infrared sensor 72 to determine whether hot or cold areas exist on the vessel 18 or the items 14. The first heating/cooling unit 62 can direct fluids to suitable locations near any hot or cold areas to cool the hot areas or warm the cold areas. This substantially eliminates hot and cold areas on the vessel 18 or the items 14 thereby substantially eliminating the problems associated with condensation.

From the above description it is clear that the present invention is well adapted to attain the advantages mentioned herein as well as those inherent in the invention. The temperature, pressure, humidity, gas mixture and other associated environmental variables described herein can be automatically monitored and corrected within the vessel 18, without manual intervention if desired, so that a predetermined environment can be maintained within the vessel 18.

The applications for such a facility 10 are numerous. For example, funguses, such as rare mushrooms can be grown within the vessel 18, or delicate items, such as cut flowers, can be stored within the vessel 18. Entire robotic production lines for producing items 14 can be set up and maintained within the vessel 18. For example, the interior of the vessel 18 can be sterilized, a vacuum can be pulled if desired, and then semiconductor products can be grown or produced within the vessel 18. Pumps (not shown) can also be utilized to move the items 14 into and out of the vessel 18, if desired. By controlling both the temperature and pressure within the vessel 18, the speed at which natural reactions, such as the conversion of organic material to petroleum or the conversion of animal waste to methane, can be enhanced.

While a presently preferred embodiment of the invention has been described for purposes of this disclosure, it will be understood that numerous changes may be made which will readily suggest themselves to those skilled in the art. Thus, changes may be made in the embodiments of the invention described herein, or in the parts or the elements of the embodiments described herein, or in the steps or sequence of steps of the methods described herein, without departing from the spirit and/or the scope of the invention as defined in the following claims.

What is claimed is:

1. A facility for maintaining at least one item in a controlled environment for extended periods of time, the facility comprising:

a vessel formed of a heat conductive material, the vessel including a foundation, a top wall and at least one sidewall extending between the foundation and the top wall, the foundation, sidewall and top wall cooperating to define an enclosed storage space adapted to receive items to be stored;

a first thermal mass layer, substantially surrounding the foundation, sidewall and top wall of the vessel such that the vessel separates the first thermal mass layer from the enclosed storage space, for storing a sufficient amount of energy to equalize the temperature of the first thermal mass layer and the vessel and for acting as a thermal barrier, the first thermal mass layer having a preselected size;

insulation means for thermally isolating the first thermal mass layer and the vessel;

a first heating/cooling unit for controlling the temperature of the first thermal mass layer and for thereby controlling the temperature of the vessel to correspond to the temperature of the first thermal mass layer;

sensor means for sensing the temperature of at least one of the first thermal mass layer, vessel, enclosed storage space, and items to be stored and for outputting a data signal indicative of the sensed temperature;

an environmental control computer operably connected to the first heating/cooling unit for receiving the data signal output by the sensor means and for selectively actuating the first heating/cooling unit and deactuating the first heating/cooling unit to maintain the sensed temperature at a substantially constant predetermined level.

2. A facility as defined in claim 1, further comprising a second thermal mass layer substantially surrounding the insulation means so that the insulation means forms a thermal break between the first thermal mass layer and the second thermal mass layer so as to thermally isolate the first thermal mass layer from the second thermal mass layer.

3. A facility as defined in claim 2, wherein the second thermal mass layer includes the earth.

4. A facility as defined in claim 1, further comprising means for reducing the pressure in the enclosed storage space and for maintaining the reduced pressure.

5. A facility as defined in claim 1, further comprising means for selectively moving the sensor means through the first thermal mass means.

6. A facility as defined in claim 1, further comprising:
a humidity sensor communicating with the enclosed storage space for outputting a data signal indicative of the humidity in the enclosed storage space; and
a humidifier communicating with the enclosed storage space for selectively varying the humidity in the enclosed storage space responsive to the data signal output by the humidity sensor.

7. A facility as defined in claim 1, wherein the first thermal mass layer includes soil.

8. A facility for maintaining items in a controlled environment for extended periods of time, the facility comprising:
a vessel including a foundation, a top wall and at least one sidewall extending between the foundation and the top wall, the foundation, sidewall and top wall cooperating to define an enclosed storage space adapted to receive items to be stored;
a first thermal mass layer substantially surrounding the foundation, sidewall and top wall of the vessel and being sufficiently large and dense so as to be capable of storing a sufficient amount of energy to cause the temperature of the vessel to be substantially identical to the temperature of the first thermal mass layer;
a second thermal mass layer substantially surrounding the first thermal mass layer;
an insulating layer interposed between the first thermal mass layer and the second thermal mass layer to thermally isolate the first thermal mass layer from the second thermal mass layer and to thereby form a thermal break between the first thermal mass layer and the second thermal mass layer;
a heating/cooling unit for selectively and directly regulating the thermal energy stored in the first thermal mass layer to control the temperature of the first thermal mass layer to change the temperature of the vessel to correspond to the temperature of the first thermal mass layer;
sensor means for sensing the temperature of at least one of the first thermal mass layer, vessel, enclosed storage space, and items to be stored and for outputting a signal indicative of the sensed temperature;

an environmental control computer operably connected to the heating/cooling unit for receiving the signal output by the sensor means for selectively actuating the heating/cooling unit and deactuating the heating/cooling unit to maintain the sensed temperature near a predetermined level.

9. A method for providing a controlled environment for an item, comprising the steps of:
providing a vessel formed of a heat conductive material, the vessel defining an enclosed storage space;
substantially encompassing the vessel with a first thermal mass layer;
thermally isolating the first thermal mass layer;
sensing the temperature of at least one of the first thermal mass layer, vessel, enclosed storage space, and items to be stored;
outputting a signal indicative of the sensed temperature; and
regulating, actively and directly, the thermal energy in the first thermal mass layer based on the signal indicative of the sensed temperature so as to thereby control the temperature of the vessel and the enclosed storage space.

10. A method for providing a controlled environment for an item, comprising the steps of:
introducing items into an enclosed storage space separated from an interior of a first thermal mass layer by a vessel formed of a heat conductive material;
thermally isolating the exterior of the first thermal mass layer;
sensing the temperature of at least one of the first thermal mass layer, vessel, enclosed storage space, and items to be stored;
outputting a signal indicative of the sensed temperature; and
regulating, actively and directly, the temperature of the first thermal mass layer based on the signal indicative of the sensed temperature so as to thereby control the temperature of the vessel and the enclosed storage space.

11. A facility for maintaining at least one item in a controlled environment for extended periods of time, the facility comprising:
a vessel formed of a heat conductive material, the vessel including a foundation, a top wall and at least one sidewall extending between the foundation and the top wall, the foundation, sidewall and top wall cooperating to define an enclosed storage space adapted to receive items to be stored;
a first thermal mass layer, substantially surrounding the foundation, sidewall and top wall of the vessel such that the vessel separates the first thermal mass layer from the enclosed storage space, for storing a sufficient amount of energy to equalize the temperature of the first thermal mass layer and the vessel and for acting as a thermal barrier and thereby retarding the flow of thermal energy from the vessel when energy is being added to the first thermal mass layer;
insulation means for thermally isolating the first thermal mass layer and the vessel;
a heating/cooling unit for controlling the temperature of the first thermal mass layer and for thereby controlling the temperature of the vessel to correspond to the temperature of the first thermal mass layer;

sensor means for sensing the temperature of at least one of the first thermal mass layer, vessel, enclosed storage space, and items to be stored and for outputting a data signal indicative of the sensed temperature;

an environmental control computer operably connected to the heating/cooling unit for receiving the data signal output by the sensor means and for selectively actuating the heating/cooling unit and deactuating the heating/cooling unit to maintain the sensed temperature at a substantially constant predetermined level; and means for reducing the pressure in the enclosed storage space and for maintaining the reduced pressure.

12. A facility for maintaining at least one item in a controlled environment for extended periods of time, the facility comprising:

a vessel formed of a heat conductive material, the vessel including a foundation, a top wall and at least one sidewall extending between the foundation and the top wall, the foundation, sidewall and top wall cooperating to define an enclosed storage space adapted to receive items to be stored;

a first thermal mass layer, substantially surrounding the foundation, sidewall and top wall of the vessel such that the vessel separates the first thermal mass layer from the enclosed storage space, for storing a sufficient amount of energy to equalize the temperature of the first thermal mass layer and the vessel and for acting as a thermal barrier and thereby retarding the flow of thermal energy from the vessel when energy is being added to the first thermal mass layer;

insulation means for thermally isolating the first thermal mass layer and the vessel;

a heating/cooling unit for controlling the temperature of the first thermal mass layer and for thereby controlling the temperature of the vessel to correspond to the temperature of the first thermal mass layer;

sensor means for sensing the temperature of at least one of the first thermal mass layer, vessel, enclosed storage space, and items to be stored and for outputting a data signal indicative of the sensed temperature;

an environmental control computer operably connected to the heating/cooling unit for receiving the data signal output by the sensor means and for selectively actuating the heating/cooling unit and deactuating the heating/cooling unit to maintain the sensed temperature at a substantially constant predetermined level; and means for selectively moving the sensor means through the first thermal mass layer.

13. A facility for maintaining items in a controlled environment for extended periods of time, the facility comprising:

a vessel including a foundation, a top wall and at least one sidewall extending between the foundation and the top wall, the foundation, sidewall and top wall cooperating to define an enclosed storage space adapted to receive items to be stored;

a first thermal mass layer substantially surrounding the foundation, sidewall and top wall of the vessel and being sufficiently large and dense so as to be capable of storing a sufficient amount of energy to cause the temperature of the vessel to be substantially identical to the temperature of the first thermal mass layer;

a second thermal mass layer substantially surrounding the first thermal mass layer;

an insulating layer interposed in between the first thermal mass layer and the second thermal mass layer to thermally isolate the first thermal mass layer from the second thermal mass layer and to thereby form a thermal break between the first thermal mass layer and the second thermal mass layer;

a first heating/cooling unit for selectively and directly regulating the thermal energy stored in the first thermal mass layer to control the temperature of the first thermal mass layer to change the temperature of the vessel to correspond to the temperature of the first thermal mass layer;

sensor means for sensing the temperature of at least one of the first thermal mass layer, vessel, enclosed storage space, and items to be stored and for outputting a signal indicative of the sensed temperature;

a second heating/cooling unit for controlling the temperature of gasses entering the enclosed storage space; and an environmental control computer operably connected to the first and second heating/cooling units for receiving the signal output by the sensor means for selectively actuating the first heating/cooling unit and the second heating/cooling unit to maintain the sensed temperature near a predetermined level.

* * * * *